(12) United States Patent
Ma et al.

(10) Patent No.: US 9,447,293 B2
(45) Date of Patent: Sep. 20, 2016

(54) BLUE INK FOR POSTAGE PRINTING

(75) Inventors: Zeying Ma, San Diego, CA (US);
Robert F. Little, San Diego, CA (US);
Peter C. Morris, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 661 days.

(21) Appl. No.: 13/702,897

(22) PCT Filed: Jun. 16, 2010

(86) PCT No.: PCT/US2010/038908
§ 371 (c)(1),
(2), (4) Date: Dec. 7, 2012

(87) PCT Pub. No.: WO2011/159298
PCT Pub. Date: Dec. 22, 2011

(65) Prior Publication Data
US 2013/0079442 A1    Mar. 28, 2013

(51) Int. Cl.
| | |
|---|---|
| *C09D 11/02* | (2014.01) |
| *C09B 67/22* | (2006.01) |
| *C09B 67/02* | (2006.01) |
| *C09C 1/00* | (2006.01) |
| *C09D 11/322* | (2014.01) |
| *C09D 11/328* | (2014.01) |
| *C09D 11/107* | (2014.01) |

(52) U.S. Cl.
CPC ........... *C09D 11/02* (2013.01); *C09B 67/0033* (2013.01); *C09B 67/0041* (2013.01); *C09B 67/0097* (2013.01); *C09C 1/00* (2013.01); *C09D 11/107* (2013.01); *C09D 11/322* (2013.01); *C09D 11/328* (2013.01); *C01P 2006/60* (2013.01); *C01P 2006/62* (2013.01); *C01P 2006/63* (2013.01); *C01P 2006/64* (2013.01); *C01P 2006/65* (2013.01); *C01P 2006/66* (2013.01)

(58) Field of Classification Search
CPC .......................... C09D 11/02; C09B 67/0033
USPC ................ 106/31.78, 31.28; 524/105, 88, 90
See application file for complete search history.

(56) References Cited

U.S. PATENT DOCUMENTS

| | | |
|---|---|---|
| 5,316,575 A | 5/1994 | Lent et al. |
| 6,387,500 B1 | 5/2002 | Behl |
| 6,391,103 B1 | 5/2002 | Auslander et al. |
| 6,503,317 B1 | 1/2003 | Ortalano et al. |
| 6,514,330 B1 | 2/2003 | Kanaya et al. |
| 6,946,025 B2 | 9/2005 | Wu et al. |

(Continued)

FOREIGN PATENT DOCUMENTS

EP    1541645    6/2005

OTHER PUBLICATIONS

European Search Report dated Apr. 23, 2013 for PCT/US2010/038908, Applicant Hewlett-Packard Development Company, L.P.

*Primary Examiner* — Liam J Heincer
*Assistant Examiner* — Nicholas Hill
(74) *Attorney, Agent, or Firm* — HP Inc. Patent Department

(57) ABSTRACT

A blue ink for postage printing, which contains a blue pigment, a black dye, and an aqueous carrier, wherein the weight ratio of blue pigment to black dye is in the range of 50:1 to 2:1. The blue pigment is a copper phthalocyanine pigment or an anthraquinone pigment, and the black dye is an azo dye.

18 Claims, 2 Drawing Sheets

(56) References Cited

U.S. PATENT DOCUMENTS

| | | |
|---|---|---|
| 7,452,415 B2 | 11/2008 | Doumaux et al. |
| 2003/0172842 A1 | 9/2003 | Blease et al. |
| 2004/0194659 A1 | 10/2004 | Taguchi |
| 2005/0115464 A1 | 6/2005 | Coughlin et al. |
| 2006/0257773 A1 | 11/2006 | Wong et al. |
| 2007/0129463 A1* | 6/2007 | Ma et al. ................... 523/160 |
| 2007/0148376 A1* | 6/2007 | Tomioka et al. ............ 428/32.1 |
| 2008/0049086 A1* | 2/2008 | Rolly ............................ 347/100 |
| 2008/0149894 A1* | 6/2008 | Auslander et al. ...... 252/301.16 |
| 2009/0018245 A1* | 1/2009 | Idemura et al. ............. 524/357 |
| 2009/0214789 A1 | 8/2009 | Tomioka et al. |

\* cited by examiner

BLUE INK FOR POSTAGE PRINTING

BACKGROUND

Postal blue indicia (i.e. markings) on mailing envelopes has been used as evidence of postage payment in many countries around the world, including France, Germany, Finland, Austria, Switzerland, Belgium, and Spain. Several other countries including UK and China are also migrating to postal blue indicia. These postage indicia contain machine-readable information, e.g. two-dimensional (2-D) bar codes, that are often printed by inkjet printing at high speed. The 2-D bar codes enable automated sorting of mails because a large amount of information can be recorded at high density. In some examples, in order for the printed indicia to be read effectively by postal machines such as optical scanners and 2-D bar code readers, the printed indicia is a high-contrast image. As such, there is imposed a strict high-contrast requirement by many countries. It may be easy for an ink to comply with the postal indicia specification of one country, but it is more difficult for one ink to meet the postal requirements of many or all countries.

DETAILED DESCRIPTION

Figure 1:
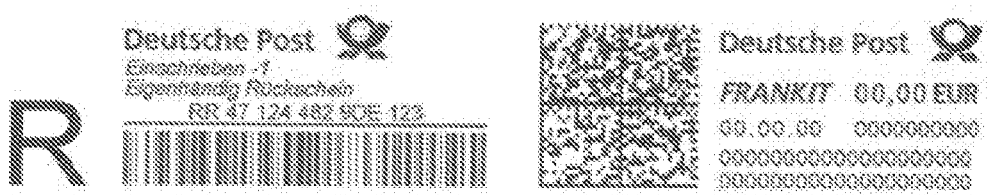
FIG. 1 shows an exemplary postal barcode that has been printed by using a blue ink formulation according to an exemplary embodiment.

Due to the strict readability requirements imposed by postal authorities worldwide, a darker blue ink is desired for printing postal indicia and bar codes. Some commercially available blue inks contain a mixture of cyan and magenta pigments. Such blue inks are not dark enough to meet the Symbol Contrast criteria (>70%) on pulp-free white envelopes with offset gray printed on the inside as specified from the German postal authority—Deutsche Post. The Symbol Contrast is measured by determining the maximum reflectance difference between the envelope and the barcode with a Barcode verifier device such as the Integra 9500 Offline Print Verification System provided by Label Vision Systems. These pigment-based blue inks also exhibit many reliability issues caused by pigment settling, short shelf life, and color non-uniformity. Water fastness is also an issue with some blue inks. Some commercially available dye-based blue inks cannot pass the water fastness test specified by the French postal authority—La Poste, even though they may pass the image contrast criteria (>70%) of the German postal specification. Most inks are water-soluble, and therefore, if the printed materials become wet, water-soluble inks are easily re-dissolved resulting in a running image. In a high-humidity environment, inks movement may also occur. "Water-fastness" refers to the ability of the ink to resist movement when the printed image is in contact with water.

In some embodiments, disclosed herein is a blue ink formulation containing a blue pigment, a black dye, and an aqueous carrier for carrying the pigment and dye to a print medium, wherein the weight ratio of blue pigment to black dye is in the range of 50:1 to 2:1. In some examples, the blue pigment is a polymer-encapsulated blue pigment dispersed throughout the aqueous carrier. In some examples, the concentration of the blue pigment in the blue ink formulation, in weight percentages (wt %), is in the range of 2.0-5.0 wt %; in some other examples, in the range of 3.0-4.5 wt %, and in yet some other examples, in the range of 3.8-4.2 wt %. In some examples, the concentration of the black dye is in the range of 0.01-1.2 wt %, in some other examples, in the range of 0.05-0.8 wt %, and in yet some other examples, in the range of 0.06-0.4 wt %. Experimentation has shown that these concentrations of blue pigment and black dye yield the desired results with regard to high image contrast, water fastness, and "decap" time (i.e., the amount of time an inkjet printhead can be left uncapped and idle and can still fire ink droplets properly). In some embodiments, the blue ink formulation may further include a free polymeric binder.

The blue ink formulation disclosed herein is suitable for use in an inkjet printing device to create and apply evidence of postage payment, i.e., digital stamp. The blue ink formulation is designed to overcome many challenges of postage blue specifications such as high contrast, overall readability, and water fastness imposed by many countries. Moreover, this blue ink formulation is designed so that it can be adopted worldwide for blue postage indicia/barcodes. It meets the toughest barcode contrast requirement imposed by Deutsche Post of Germany, and at the same time, meets the strictest water fastness requirement imposed by La Poste of France.

Blue Pigment

In some embodiments, the blue pigment in the ink formulation takes the form of dispersed particles that are sufficiently small to permit free flow of the ink through the inkjet printing device, especially at the ejecting nozzles that have a diameter ranging from 10 micron to 50 micron. The particle size also has an influence on the pigment dispersion stability. Brownian motion of minute particles can help to prevent the particles from flocculating. The small particles is often desirable for maximum color strength, as well as for printhead reliability and service ability. In some examples, the range of particle size is approximately 0.005 micron to 1 micron. In some other examples, the pigment particle size should range from 0.005 to 0.5 micron and, in yet some other examples, from 0.010 to 0.3 micron, and from about 0.010 to 0.15 micron.

In some embodiments, the blue pigment particles are at least partially encapsulated with a polymer, which includes a styrene copolymer, an acrylic acid or acrylate copolymer, a methacrylic acid or methacrylate copolymer, a maleic anhydride copolymer, and combination thereof. In some examples, the copolymer is a styrene-acrylic acid copolymer (or ester thereof), or styrene-acrylic acid-methacrylic acid copolymer for ester thereof). Suitable copolymers may have any average molecular weight that is functional, but in some examples, may be from 5,000 Mw to 20,000 Mw, or from 5000 Mw to 15,000 Mw, or from 8,000 Mw to 11,000 Mw. In some examples, the encapsulating polymer can be a copolymer having an acid number from 100 to 220 mg KOH/g, or in some other examples, from 150 to 200 mg KOH/g. In some examples, the weight ratio of the encapsulating polymer to pigment (R/P) may be in the range of 0.1-1.0; in some other examples, in the range of 0.2-0.4. The encapsulating polymer (also referred to as a dispersant), can be physically absorbed onto the pigment particles so as to provide the pigment particles with some charge, thereby creating some repulsive nature that reduces agglomeration of pigment particles within the liquid carrier. In some examples, the polymer-encapsulated blue pigment is formed by mixing the blue pigment with a polymer capable of encapsulating the pigment in a liquid medium to form a pigment dispersion, and this dispersion is then subjected to milling to reduce the pigment particle size to a desired level.

Perceived color quality of inks can be characterized using any one of several color space systems, such as Munsell or CIELAB, as is well known in the art. With respect to the Munsell color space, a given color is defined using three terms, namely Hue (H), Value (V), and Chroma (C). With respect to the CIELAB color space, a color is defined using three terms L*, a*, and b*. With the CIELAB system, L* defines the lightness of a color and ranges from 0 (black) to 100 (white). L* is a good measure of chroma with a low L* value being very dark. In addition, the terms a* and b* may be used to define the hue and chroma of a color, where a* ranges from a negative number (green) to a positive number (red) and b* ranges from a negative number (blue) to a positive number (yellow). The additional terms of H (hue angle) and C* (chroma) are also used to further describe a given color, as is known to those skilled in the art. H° is calculated according to the following formula:

$$H=\tan^{-1}(b^*/a^*)$$

wherein H is in degrees; if H<0, add 360°; if H≥360, subtract 360°.

C* is calculated according to the following formula:

$$C^*=\sqrt{(a^*)^2+(b^*)^2}$$

In some embodiments, the blue ink formulation is designed so as to produce a blue color on print media with the following color specification:
Lightness (L*) between 30 and 65;
a* within the range of −12 to 5;
b* within the range of −20 to −60;
Chroma (C*) between 22 and 45;
Hue angle (H) between 255 and 275 degrees.

In some examples, to achieve the target color specification discussed above, the blue pigment is a copper phthalocyanine pigment having the following general Structure (I):

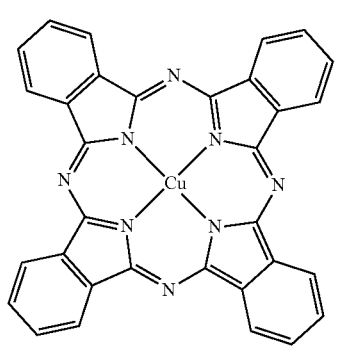

Structure (I)

or an anthraquinone pigment having the following general Structure (II):

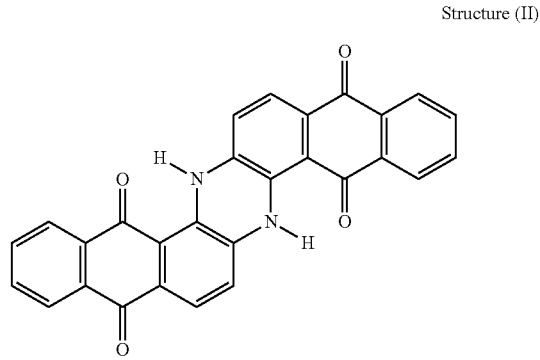 [SMILES: O=c1c2ccccc2c(=O)c2c1ccc1[nH]c3c(ccc4c(=O)c5ccccc5c(=O)c43)[nH]c12]

Structure (II)

In some examples, a commercially available blue pigment with Structure I is C.I. Pigment Blue 15:6 ("PB15:6") and that with Structure II is C. I. Pigment Blue 60 ("PB60").

Tables 1 and 2 show the colorimetry L*a*b* data of color inks based on blue pigments (PB15:3, PB60, PB15:6) and violet pigment (PV23) and printed on pulp-free white envelope with gray offset printed on the inside (a product of 2H-Papier Grosshandels-GmbH & Co KG, with reference number 48171000). The reference numbers 0-12 refer to an ink density ramp, wherein 0=0% ink, 12=100% ink.

TABLE 1

|   | PV23 | | | PB15:3 | | |
|---|---|---|---|---|---|---|
|   | L* | a* | b* | L* | a* | b* |
| 0 | 90.82 | 1.89 | −7.67 | 89.22 | 2.07 | −7.82 |
| 1 | 60.57 | 9.55 | −17 | 66.34 | −14.84 | −36.42 |
| 2 | 55.75 | 9.38 | −17.2 | 62.93 | −16.03 | −40.39 |
| 3 | 50.68 | 10.3 | −17.7 | 59.94 | −16.37 | −42.86 |
| 4 | 46.8 | 10.6 | −18 | 57.67 | −16.01 | −44.47 |
| 5 | 44.19 | 10.7 | −17.8 | 56.3 | −15.94 | −46.56 |
| 6 | 41.72 | 11.5 | −18.1 | 54.93 | −15.45 | −47.14 |
| 7 | 40.4 | 11.1 | −17.4 | 53.78 | −14.61 | −47.34 |
| 8 | 39.36 | 10.4 | −16.2 | 53.45 | −14.3 | −47.67 |
| 9 | 38.35 | 10.1 | −15.7 | 52.54 | −13.43 | −47.51 |
| 10 | 36.23 | 10.8 | −15.5 | 52.06 | −12.99 | −47.17 |
| 11 | 36.81 | 9.2 | −14.5 | 51.61 | −12.75 | −47.69 |
| 12 | 36.06 | 8.99 | −13.9 | 49.96 | −11.39 | −47.39 |

TABLE 2

|   | PB60 | | | PB15:6 | | |
|---|---|---|---|---|---|---|
|   | L* | a* | b* | L* | a* | b* |
| 0 | 91.94 | 1.09 | −9.21 | 92.26 | 1.09 | −8.82 |
| 1 | 66.23 | −2.56 | −32.66 | 70 | −7.88 | −39.11 |
| 2 | 62.96 | −2.23 | −35.11 | 65.55 | −7.44 | −43.64 |
| 3 | 60.54 | −1.89 | −37.2 | 62.34 | −7.2 | −47.39 |
| 4 | 59.51 | −1.87 | −37.99 | 60.17 | −6.6 | −49.3 |
| 5 | 58.75 | −1.71 | −39.28 | 58.41 | −6 | −51.07 |
| 6 | 58.75 | −1.78 |  | 57.46 | −5.57 | −51.8 |
| 7 | 55.37 | −0.77 | −40.83 | 55.57 | −4.4 | −53.09 |
| 8 | 52.86 | 0.19 | −41.32 | 53.98 | −3.38 | −54.19 |
| 9 | 50.8 | 0.77 | −41.51 | 52.68 | −2.42 | −54.6 |
| 10 | 50.27 | 0.86 | −41 | 51.78 | −1.83 | −55.13 |
| 11 | 49.47 | 1.06 | −40.32 | 51.36 | −1.49 | −54.56 |
| 12 | 48.42 | 1.13 | −40.19 | 50.69 | −0.83 | −54.4 |

Based on calculations, the blue pigments PB15:6 and PB60 produce the target hue angle (between 255 and 275 degrees) and aroma range (between 22 and 45), while PB15:3 and PV23 do not. As such, not all blue pigments can produce the target color specification of the blue ink formulation disclosed herein. In some examples, a single blue pigment with the right hue angle is used. Although a mixture of Cyan and Magenta pigments (in some commercial inks) can produce the desired blue hue, a correct individual pigment offers on-target color quality and inkjet pen jetting reliability. Indeed, without being linked by any theory, it is believed that one pigment dispersion stable is much easier than to make two-pigment dispersion stable.

Black Dye

In some examples, the black dye is an azo dye, including mono-azo dyes, diazo dyes, and triazo dyes, etc. In some other examples, the black dye is a triazo dye having the following general Structure (III) or (IV):

imposed by some countries such as La Poste of France. In some examples, it is believed that the black dye helps to reduce the chroma of the blue pigment so that it will meet the aroma range between 22 and 45 for the French Post requirements, and that, with no black dye, the aroma would be out of range.

Polymeric Binder

The blue ink formulation may further include a free polymeric binder dispersed throughout the aqueous carrier. The polymeric binder acts to secure the colorants on the substrate. In some examples, binders suitable for use herein have a molecular weight of from about 100 to about 50,000 g/mole. Non-limiting examples include styrene-maleic anhydride copolymers, polyester, polyester-melanine, styrene-acrylic acid copolymers, styrene-acrylic acid-alkyl acrylate copolymers, styrene-maleic acid copolymers, sty-

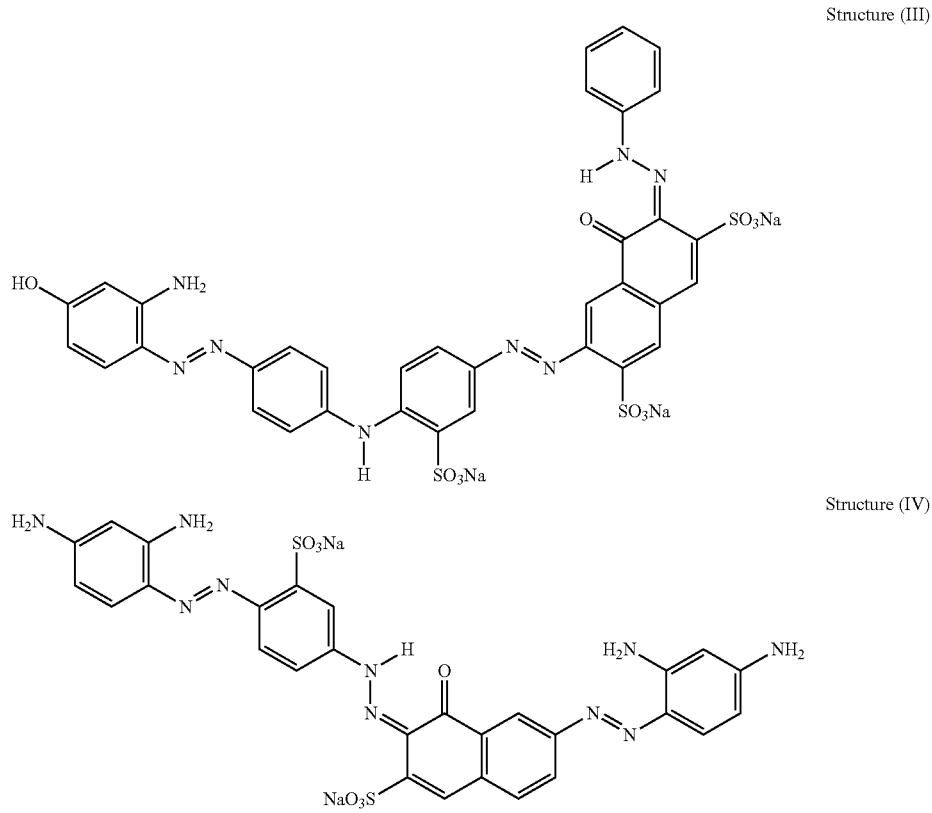

Structure (III)

Structure (IV)

A commercially available black dye with Structure (III) is C. I. Direct Black 168 and that with Structure (IV) is C. I. Direct Black 36.

Without being linked by any theory, it is believed that the black dye helps to meet the symbol contrast criteria (>70%) for bar code readability according to the German postal specification. It is also believed that blue ink with blue pigment alone cannot reach that high contrast level. Indeed, in some examples, pigment concentration does not exceed 5.0 wt % in order for the pen in the inkjet printing device to fire reliably. In some others examples, the addition of a small amount (0.01-1.2 wt %) of a black dye, particularly black azo dye, to the blue pigment ink helps to fulfill the contrast target. Furthermore, in some examples, it is believed that if higher amount of black azo dye is added, the water fastness indicia would not meet the water fastness requirement rene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, styrene-acrylic acid-methacrylic acid copolymers, and derivatives and salts thereof. It should be noted that when multiple monomers are listed as part of a copolymer, such a designation is an open listing of monomers present in the copolymer. Other monomers, cross-linking agents, etc., can also be present. For example, a styrene-maleic anhydride copolymer includes at least these two monomers, and may include other monomers as well. Further, it should be noted that if the binder is in a particulate dispersed form, then it is not considered to be part of the aqueous carrier, but is considered to be carried by the aqueous carrier.

Aqueous Carrier

As used herein, "aqueous carrier" is defined to include liquid compositions that can be used to carry colorants to a print medium, often referred to as "ink vehicle". The aqueous carrier may include water or a mixture of water and water-soluble or water-miscible organic solvents. Suitable solvents for use herein include water-soluble organic solvents, but are not limited to, aliphatic alcohols, aromatic alcohols, diols, glycol ethers, poly(glycol)ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. Specific examples of water-soluble or water-miscible organic solvents include, but are not limited to, a polyhydric alcohol, such as ethyleneglycol, diethyleneglycol ("DEG"), triethyleneglycol ("TEG"), tetraethylenedycol, polyethyleneglycol, and glycerol; a polyhydric alcohol ether, such as ethyleneglycolmonomethylether, ethyleneglycolmonoethylether, ethyleneglycolmonobutylether, diethyleneglycolmonoethylether, diethyleneglycolmonobutylether, and ethylene glycol monophenyl ether; a nitrogen-containing solvent, such as N-methyl-2-pyrrolidone, a substituted pyrrolidone, and triethanol amine; or mixtures thereof. Monohydric alcohols, such as methanol, ethanol, isopropyl alcohol, or mixtures thereof may also be used in the ink. The ink may also include nitrogen-containing ketones, such as 2-pyrrolidone, hydroxyethyl-2-pyrrolidone, N-methyl-pyrrolid-2-one, 1,3-dimethylimidazolid-2-one, and octyl-pyrrolidone; diols, such as ethanediols (e.g., 1,2-ethanediol), propanediols (e.g., 1,2-propanediol, 1,3-propanediol, 2-ethyl-2-hydroxymethyl-1,3-propanediol, ethylhydroxypropanediol ("EHPD")), butane-diols (e.g., 1,2-butanediol, 1,3-butanediol, 1,4-butanediol), pentanediols (e.g. 1,2-pentanediol, 1,5-pentanediol), hexanediols (e.g., 1,2-hexanediol, 1,6-hexanediol, 2,5-hexanediol), heptanediols (e.g., 1,2-heptanediol, 1,7-heptanediol), octanediols (e.g., 1,2-octanediol, 1,8-octanediol); alcohols, such as $C_3$-$C_6$ alcohols (e.g., propanol, butanol, pentanol, and hexanol), including isomers thereof (e.g., 1-propanol and 2-propanol); glycol ethers and thioglycol ethers commonly employed in inks, such as polyalkylene glycols including, but limited to, propylene glycols (e.g., dipropylene glycol, tripropylene glycol, tetrapropylene glycol); polymeric glycols (e.g., PEG 200, PEG 300, PEG 400, PPG 400); thiodiglycol; and mixtures thereof. Additional organic solvents that may be used include hydantoins (glycol ureas) and derivatives thereof, such as a hydantoin containing ethyl hydroxide and methyl groups, available from Lonza, Inc. as Dantocol DHE, and polyalkoxylated triols, such as Multranol 4012, which is a polyalkoxylated triol having a molecular weight of about 440, available from Bayer. In some examples, if the ink vehicle includes organic solvents, the organic solvents may be present from approximately 5 wt % to approximately 70 wt % of a total weight of the ink vehicle while the water is present from approximately 30 wt % to approximately 95 wt %.

Ink Additives

The blue ink formulation may also include ink additives including, but not limited to, surfactants, biocides, chelating agents, and pH adjusting agents. The surfactants may be a nonionic, anionic, or cationic surfactants. Non-limiting examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and fluorinated surfactants such as perfluoroalkyl ethylene oxide adducts. Examples of commercially available surfactants that may be used include, but are not limited to, the SURFYNOL® series (acetylenic polyethylene oxides) available from Air Products (Allentown, Pa.), the TETRONIC® series (tetrafunctional block copolymers of propylene oxide, ethylene oxide, and ethylene diamine) available from BASF Canada (Toronto. Ontario), the TERGITOL® series (alkyl polyethylene oxides) available from Union Carbide Co. (Houston, Tex.), the BRIJ® series (polyethoxylated alcohols and esters) available from ICI Americas (Wilmington, Del.), the TRITON® series (alkyl phenyl polyethylene oxides) available from Rohm & Haas (Philadelphia, Pa.), the ZONYL® series of fluoropolymers available from DuPont (Wilmington, Del.). In some examples, the surfactant(s) may be present in the ink from approximately 0.01 wt % to approximately 5 wt % of the total weight of the ink.

In another aspect of the present disclosure, various biocides can be used to inhibit growth of undesirable microorganisms. Several non-limiting examples of suitable biocides include benzoate salts, sorbate salts, and commercial products such as NUOSEPT (Nudex, Inc., a division of Huls America), UCARCIDE (Union Carbide), VANCIDE (RT Vanderbilt Co.), and PROXEL GXL (1,2-benzisothiazolin-3-one) from Avecia Inc. Such biocides may be present at less than about 5 wt of the ink formulation, for example, at about 0.05 wt % to about 2 w %.

In some examples, the blue ink formulation can be prepared by mixing the pre-made dispersion of polymer-encapsulated blue pigment with the black dye and the aqueous carrier to form a solution. A free binder can be added, and/or ink additives discussed above. In some examples, the blue ink formulation is prepared so as to be jettable and has a viscosity within the range of about 1-15 centipoise (cps); in some other examples, within the range of about 2-8 cps, and in yet other examples within the range of about 2-5 cps.

The formulation of the blue ink disclosed herein can meet the strict postal indicia requirements of both German and French postal authorities, particularly, symbol contrast and water fastness. Furthermore, it is believed that because this blue ink contains only one pigment colorant, inkjet pen ejection reliability is significantly improved.

Numerical values, such as ratios, concentrations, amounts, molecular sizes, etc., may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

EXAMPLES

The following Examples will serve to illustrate representative embodiments of the present disclosure and should not be construed as limiting of the disclosure in any way. All percentages (%) are by weight unless otherwise indicated.

Example 1

Ink formulations F1, F2, and F3 were prepared according to the formulations disclosed in Tables 3-5.

TABLE 3

| Components for F1 | wt % |
| --- | --- |
| PB15:6 blue pigment | 4.2 |
| Direct Black 168 dye | 0.6 |
| 1,6-hexanediol | 9.0 |
| Hydroxyethyl-2-pyrrolidone | 9.0 |
| Liponics ethylene glycol 1 (LEG-1) | 2.0 |
| Nonionic surfactant | 0.25 |
| Fluorinated surfactant | 0.05 |
| Diethylene glycol (DEG) | 3.8 |
| Kordek MLX (biocide) | 0.14 |
| Proxel GXL (biocide) | 0.05 |
| Styrene-acrylic polymer | 1.26 |
| Deionized water | balance |

TABLE 4

| Components for F2 | wt % |
| --- | --- |
| PB15:6 blue pigment | 4.0 |
| Direct Black 168 dye | 0.4 |
| 1,6-hexanediol | 9.0 |
| Hydroxyethyl-2-pyrrolidone | 9.0 |
| 2-pyrrolidone | 5.0 |
| Nonionic surfactant | 0.16 |
| Dowfax 2A1 | 0.32 |
| Fluorinated surfactant | 0.25 |
| Styrene-acrylic polymer | 1.26 |
| Deionized water | balance |

TABLE 5

| Components for F3 | wt % |
| --- | --- |
| PB60 blue pigment | 4.0 |
| Direct Black 168 dye | 0.4 |
| 1,6-hexanediol | 9.0 |
| Hydroxyethyl-2-pyrrolidone | 9.0 |
| 2-pyrrolidone | 5.0 |
| Nonionic surfactant | 0.16 |
| Dowfax 2A1 | 0.32 |
| Fluorinated surfactant | 0.25 |
| Styrene-acrylic polymer | 1.26 |
| Deionized water | balance |

In the ink formulations F1-F3, the nonionic surfactant is mixture of alkyl ethoxylate and 2,4,7,9-tetramethyl-5-decyne-4,7 diol. The fluorinated surfactant is a perfluoroalkyl ethylene oxide adduct. The blue pigment is encapsulated with the styrene-acrylic polymer in the ink formulation, but a portion of the styrene-acrylic polymer is also free-flowing polymer.

The blue ink formulations F1-F3 were used to print barcode symbols by thermal inkjet printing on pulp-free white envelopes (with gray offset printed on the inside) (from 2H-Papier Grosshandels-GmbH & Co KG, with reference number 48171000) to measure Symbol Contrast and on White envelopes (commercially available from La Couronne with reference number 12963) to measure Water-fastness and Chroma. Ink was applied in an amount of 9 nanograms to each pixel at the resolution of 1200×300 dpi to print a barcode image on the envelope so as to give an application amount of 3.24 mg/in$^2$ to 4.86 mg/in$^2$, and the resultant printed image was left to stand for 24 hours after the printing.

Symbol contrast measurement, water-fast test, and chroma measurement were subsequently performed. The symbol contrast of the printed barcodes was measured by using an Integra 9500 Offline Print Verification System provided by Label Vision Systems—with an illuminating white light of 5600 deg K at an angle of 45° with respect to the printed barcodes. A minimum constraint for symbol contrast is 60%, as such, any value above 60% is considered good, while symbol contrast at or above 70% is considered excellent.

The Water-fast test was based on a standing-water evaporation test (from the ISO18935 specification for determining water resistance on printed images). A 0.1 ml drop of water was placed on the barcodes printed on White envelopes commercially available from La Couronne with reference number 12963 and allowed to dry for 24 hours at ambient conditions. Subsequently, the printed barcodes were graded by the Integra 9500 barcode verifier as follows: 0-0.5=Fail; 0.5-1.5=Poor; 1.5-2.5=Fair/Acceptable; 2.5-3.5=good; 3.5-4=Excellent (according to the ISO/IEC 15415 specification for Barcode Print Quality of Two Dimensional Symbols).

Chroma was also measured for the blue inks F1-F3 on the printed on White envelopes (commercially available from La Couronne with reference number 12963). Chroma measurement was performed on 15×15 mm$^2$ patch of blue ink printed on using an X-Rite 528 Spectrophotometer and D65 light source at 10 degree observer angle.

The results of the symbol contrast measurement, water-fast test, and chroma measurement are shown in Table 6.

TABLE 6

| | F1 | F2 | F3 |
| --- | --- | --- | --- |
| Symbol contrast: (3.24 mg/in$^2$ print mode on 2H-Papier envelopes with reference #48171000) | 68% | 64% | 66% |
| Symbol contrast: (4.86 mg/in$^2$ print mode on 2H-Papier envelopes with reference # 48171000) | 72% | 67% | 69% |
| Chroma (3.24 mg/in$^2$ print mode on La Couronne envelopes with reference # 12963) | 26.0 | 23.15 | 20.37 |
| Chroma (4.86 mg/in$^2$ print mode on La Couronne envelopes with reference # 12963) | 27.3 | 21.21 | 19.11 |
| Overall Barcode grade after water-fast test (3.24 mg/in$^2$ print mode on La Couronne envelopes with reference #12963) | 2.0 | 1.6 | 2.7 |

Figure 2:
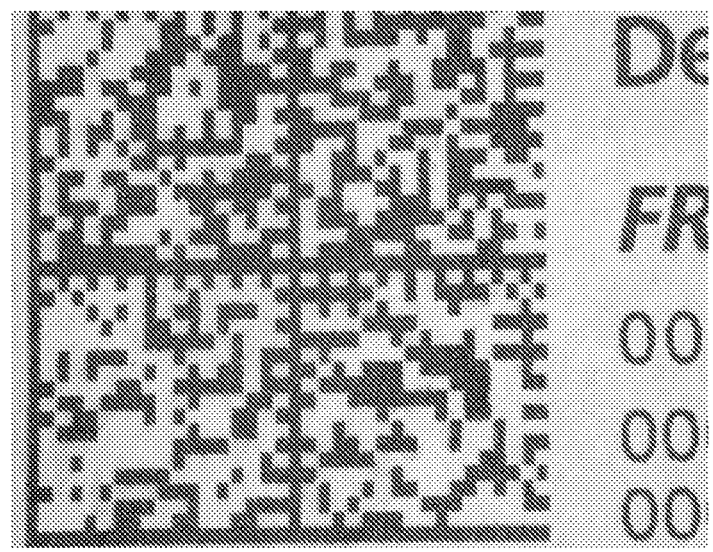
FIG. 2 is an exploded view of a portion of the postal barcode of FIG. 1 after a water-fast test.
Figure 3:
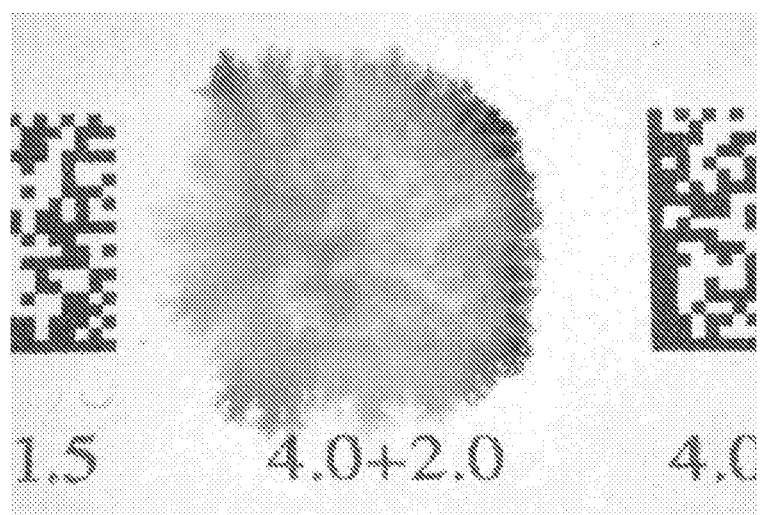
FIG. 3 is an exploded view of a portion of a postal barcode that has been printed by using a comparative blue ink and then subjected to a water-fast test.

FIG. 1 shows a printed postal barcode produced by using the blue ink F1. FIG. 2 shows that the barcode printed with blue ink F1 after the water-fast test was still readable by an optical scanner and the watermark left by the dye was barely noticeable. For comparison, a commercially available blue ink (Collins Fast Dry CM-457) was used to print another postal barcode. This ink is based on a blend of cyan dye and sulphonated magenta dye. The printed postal bar code was subjected to the same standing water test described above. The barcode became unrecognizable as shown in FIG. 3.

Example 2

A comparative blue ink based on a blend of blue, violet and black pigments was prepared according to the formulation disclosed in Table 7.

TABLE 7

| Components | Wt % |
| --- | --- |
| PB15:3 (blue pigment) | 4.0 |
| PV23 (violet pigment) | 0.5 |
| Carbon black pigment | 1.0 |
| 2-pyrrolidone | 10 |
| Liponics ethylene glycol 1 (LEG-1) | 1.5 |
| Triethyleneglycol (TEG) | 4.0 |
| Styrene-acrylic polymer | 0.5 |
| Surfynol 440 | 0.15 |
| Zonyl FSO (fluorinated surfactant) | 0.10 |
| Deionized water | balance |

A postal barcode was printed using the comparative blue ink above. Symbol contrast was measured as in Example 1 and found to be good at 68-69%, but Chroma was measured as described in Example 1 and found to be too low at 14.

Example 3

A comparative blue ink was prepared according to the formulation disclosed in Table 8.

TABLE 8

| Components | wt % |
| --- | --- |
| PB15:6 blue pigment | 4.0 |
| PJFC2 cyan pigment | 0.4 |
| 1,6-hexanediol | 9.0 |
| Hydroxyethyl-2-pyrrolidone | 9.0 |
| 2-pyrrolidone | 5.0 |
| Nonionic surfactant | 0.16 |
| Dowfax 2A1 | 0.32 |
| Fluorinated surfactant | 0.25 |
| Styrene-acrylic polymer | 1.26 |
| Deionized water | balance |

A postal barcode was printed using the comparative blue ink above. Symbol contrast was measured as in Example 1 and found to be too low at 52%. Chroma was measured as described in Example 1 and found to be too high at 45 to 47.

The foregoing description of various embodiments of the present disclosure has been presented for purposes of illustration and description. It is not intended to be limited to the precise form or to exemplary embodiments disclosed. Numerous modifications and alternative compositions, methods, and systems may be devised by those skilled in the art without departing from the spirit and scope of the present disclosure. The appended claims are intended to cover such modifications and arrangements.

What is claimed is:

1. A blue ink for postage printing comprising:
a blue pigment, a black dye, and an aqueous carrier, wherein the weight ratio of blue pigment to black dye is in the range of 50:1 to 2:1,
wherein the blue pigment is selected from a group consisting of a copper phthalocyanine pigment and an anthraquinone pigment; and the black dye is an azo dye;
wherein, when printed as a barcode, the blue ink has a symbol contrast of at least 60% and has a water fastness of at least 1.5; and
wherein the blue ink provides a blue color on a print medium with the following color specification according the CIELAB system:
Lightness between 30 and 65;
a* within the range of −12 to 5;
b* within the range of −20 to −60;
Chroma between 22 and 45; and
Hue angle between 255 and 275.

2. The blue ink of claim 1, wherein the blue pigment is present in an amount ranging from 2.0% to 5.0% by weight, and the black dye is present in an amount ranging from 0.01% to 1.2% by weight.

3. The blue ink of claim 1, wherein the blue pigment is at least partially encapsulated with a polymer.

4. The blue ink of claim 3, wherein said polymer has an average molecular weight of 5,000 Mw to 20,000 Mw, and an acid number from 100 to 220 mg KOH/g.

5. The blue ink of claim 3, wherein the weight ratio of polymer to blue pigment is in the range of 0.1-1.0.

6. The blue ink of claim 3, wherein said polymer is a styrene-acrylic copolymer.

7. The blue ink of claim 1, wherein the black dye is a triazo dye.

8. The blue ink of claim 1, further comprising a polymeric binder.

9. The blue ink of claim 1, wherein the aqueous carrier comprises a mixture of water, at least one water-soluble or water-miscible organic solvent, and at least one surfactant.

10. The blue ink of claim 1, wherein the blue ink has a symbol contrast ranging from 60% to 72%.

11. The blue ink of claim 1, wherein the blue ink has a water fastness ranging from 1.5 to 2.7.

12. A blue ink for postage printing comprising:
a blue pigment, a black dye, and an aqueous carrier, wherein the weight ratio of blue pigment to black dye is in the range of 50:1 to 2:1,
wherein the blue pigment is a copper phthalocyanine pigment and the black dye is an azo dye;
wherein, when printed as a barcode, the blue ink has a symbol contrast of at least 60% and has a water fastness of at least 1.5; and
wherein the blue ink provides a blue color on a print medium with the following color specification according the CIELAB system:
Lightness between 30 and 65;
a* within the range of −12 to 5;
b* within the range of −20 to −60;
Chroma between 22 and 45; and
Hue angle between 255 and 275.

13. The blue ink of claim 12, wherein the blue pigment is present in an amount ranging from 2.0% to 5.0% by weight, and the black dye is present in an amount ranging from 0.01% to 1.2% by weight.

14. The blue ink of claim 12, wherein the blue pigment is at least partially encapsulated with a polymer having an average molecular weight of 5,000 Mw to 20,000 Mw, and an acid number from 100 to 220 mg KOH/g.

15. The blue ink of claim 14, wherein said polymer is a styrene-acrylic copolymer.

16. The blue ink of claim 14, wherein the weight ratio of polymer to blue pigment is in the range of 0.1-1.0.

17. The blue ink of claim 12, wherein the blue ink has a symbol contrast ranging from 60% to 72%.

18. The blue ink of claim 12, wherein the blue ink has a water fastness ranging from 1.5 to 2.7.

* * * * *